United States Patent
Thurgood et al.

(10) Patent No.: US 8,806,499 B2
(45) Date of Patent: Aug. 12, 2014

(54) MECHANISM TO BUILD DYNAMIC LOCATIONS TO REDUCE BRITTLENESS IN A TEAM ENVIRONMENT

(75) Inventors: Brent Thurgood, Spanish Fork, UT (US); Lee Edward Lowry, Orem, UT (US); Zack Grossbart, Cambridge, MA (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1410 days.

(21) Appl. No.: 12/120,793

(22) Filed: May 15, 2008

(65) Prior Publication Data
US 2009/0288093 A1 Nov. 19, 2009

(51) Int. Cl.
*G06F 9/46* (2006.01)

(52) U.S. Cl.
USPC .............................. 718/104; 718/100; 718/102

(58) Field of Classification Search
USPC .......................... 718/100, 101, 102, 104, 106
See application file for complete search history.

(56) References Cited

U.S. PATENT DOCUMENTS

| | | | |
|---|---|---|---|
| 6,208,991 B1 | 3/2001 | French et al. | |
| 6,233,621 B1 * | 5/2001 | Joy | 719/315 |
| 6,507,848 B1 | 1/2003 | Crosby et al. | |
| 6,535,867 B1 * | 3/2003 | Waters | 1/1 |
| 7,216,135 B2 | 5/2007 | Sawdon et al. | |
| 7,225,219 B2 * | 5/2007 | Giacomini et al. | 709/200 |
| 7,263,696 B1 | 8/2007 | Gruttadauria et al. | |
| 7,603,366 B1 * | 10/2009 | Gritsay et al. | 1/1 |
| 8,099,420 B2 * | 1/2012 | Farber et al. | 707/758 |
| 2001/0016842 A1 * | 8/2001 | Umen et al. | 707/1 |
| 2005/0138034 A1 * | 6/2005 | Faraj | 707/10 |
| 2006/0117257 A1 * | 6/2006 | Hasson et al. | 715/535 |
| 2006/0265714 A1 * | 11/2006 | Bissett et al. | 718/104 |
| 2007/0233832 A1 * | 10/2007 | Narayanan et al. | 709/223 |
| 2009/0106764 A1 * | 4/2009 | Klementiev et al. | 718/104 |
| 2013/0185266 A1 * | 7/2013 | Horn et al. | 707/691 |

OTHER PUBLICATIONS

Levy et al. "Distributed file systems: concepts and examples", Dec. 1990, vol. 22 Issue 4, pp. 321-374.*
Bray, Tim , et al., "Extensible Markup Language (XML) 1.0 (Second Edition)", http://www.w3.org/TR/2000/REC-xml-20001006, W3C Recommendation,(Oct. 2000).

* cited by examiner

*Primary Examiner* — Emerson Puente
*Assistant Examiner* — Willy W Huaracha
(74) *Attorney, Agent, or Firm* — Schwegman, Lundberg & Woessner, P.A.

(57) ABSTRACT

Mechanisms to build dynamic locations to reduce brittleness in a team environment are provided. A project includes resources, each resource is assigned a key. Each key is mapped to a current location for its corresponding resource. The keys and locations are maintained in an index. Locations for the resources can change as desired throughout the lifecycle of the project and as changes occur the index is updated. When references are made within the project to the resources, the references are translated to the keys, if necessary. The keys are then used for accessing the index and dynamically acquiring the current locations for the resources at the time the references are made.

22 Claims, 3 Drawing Sheets

MECHANISM TO BUILD DYNAMIC LOCATIONS TO REDUCE BRITTLENESS IN A TEAM ENVIRONMENT

BACKGROUND

Collaborative environments are becoming pervasive in the industry. One area of collaboration that is critical to an enterprise is that which is associated with new software development. During software development a variety of different developers can be working on the same or dependent modules at the same time and from entirely different processing environments from one another. A variety of different project life-cycle and version control systems attempt to coordinate project activities in scenarios such as this.

One problem that nearly every software development project faces is module dependency. That is, one developer may be working on a particular aspect of the project and may have a valid reason for renaming or even moving one of his/her software modules. However, other developers working on other aspects of the project may be entirely unaware of this and may have coded their modules to specifically reference the first developer's module in its old location. This creates module brittleness and results in a lot of project churn and inefficiency.

Stated another way, a significant drawback to project-based environments is that often individual developers have complete control over where they store their software and other project members often rely on that software. A developer may have a temporary fix that needs to be made to a module and may temporarily move it and then forget to put it back where it belongs. Alternatively, the developer may have created other dependencies with other software and may legitimately need to permanently change the location of the software. When the other dependent project members process their code, their code breaks because the location of the software to which they relied on changed. This situation is a common occurrence in software development and happens very frequently.

Thus, what is needed are improved techniques for resolving the locations of project modules in a project-based environment so as to reduce brittleness associated with the conventional approaches.

SUMMARY

In various embodiments, mechanisms for building dynamically locations for purposes of reducing brittleness in a team environment are provided. More specifically, and in an embodiment, a method is provided for dynamically resolving a project resource's location. A reference made to a first resource is identified; the reference originates from an application processing on a machine. Next, a determination is made as to whether the reference is a first key, which is associated with the first resource or as to whether the reference is a file path, which is associated with the first resource and when the reference is the file path, the file path is hashed to the first key. The first key is then resolved to a current location known for the first resource. The reference that originated from the application is then redirected to the current location for the application to access the first resource.

DETAILED DESCRIPTION

Figure 1:
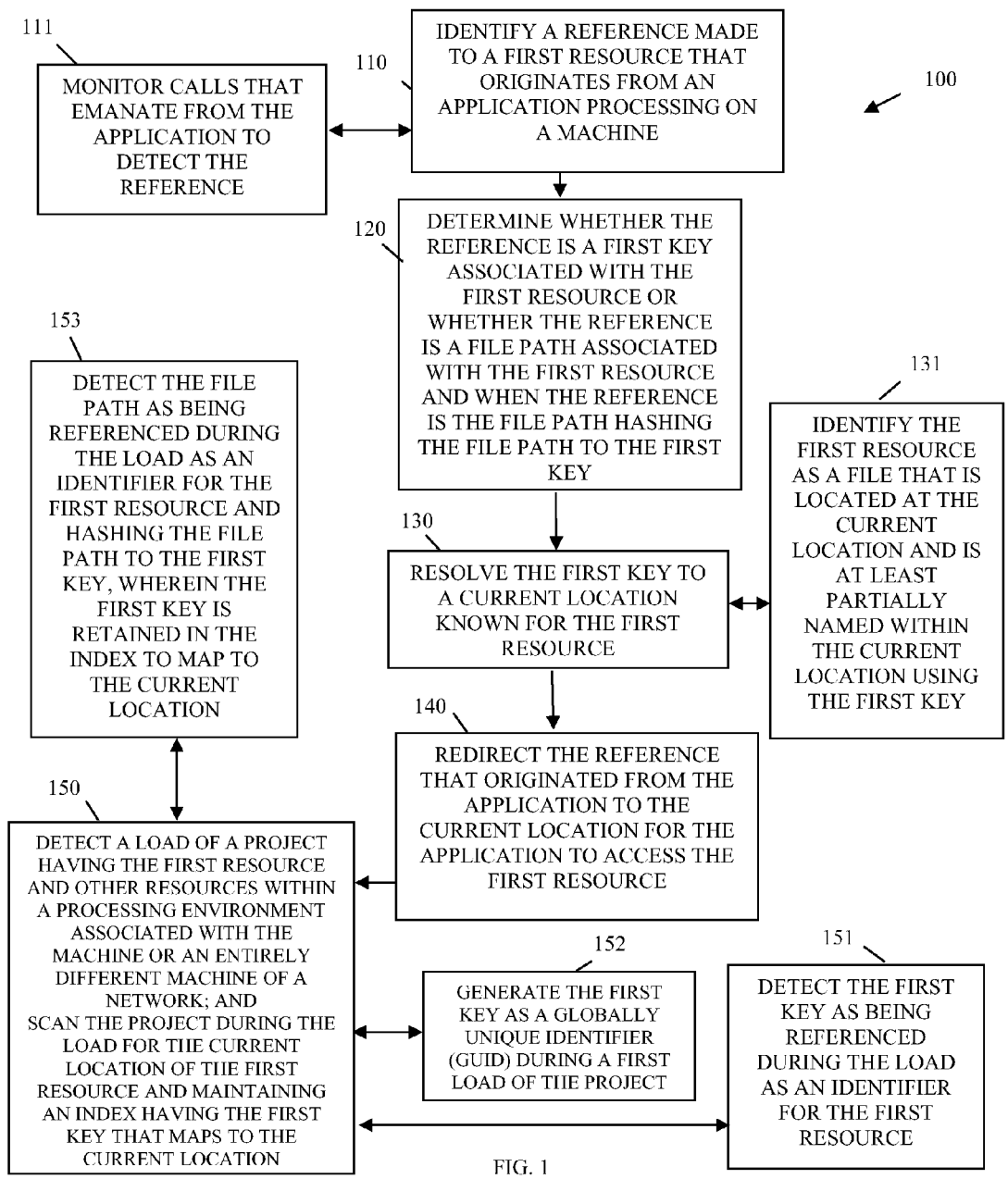
FIG. 1 is a diagram of a method for dynamically resolving a project resource's location, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

The project includes a variety of other resources that have dependencies with one another within a project processing environment.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

As used herein "hashing" or "hashing algorithm" is used to acquire a unique key using a variety of factors discussed herein and below in context. There may be some collisions while hashing but collision management results in a unique key. Any conventional hashing technique or algorithm can be used to achieve resolution of the unique key. So, the hashing is a form a mapping in that it is used (collisions or no collisions) to result in a unique key.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for dynamically resolving a project resource's location, according to an example embodiment. The method 100 (hereinafter "resource location resolution service") is implemented as instructions in a machine-accessible and computer-readable storage readable medium. The instructions when executed by a machine (processor and memory enabled device) perform the processing depicted in the FIG. 1. The resource location resolution service is also operational over and processes within a network. The network may be wired, wireless, or a combination of wired and wireless.

As will be more fully described herein and below, the resource location resolution service permits applications to references resources within a project via a key or via legacy references, each reference is resolved to a key and a then-existing location for the resource are acquired for the calling application. In this manner, project administration can be more easily achieved because developers are free to change the locations of resources as needed without breaking the usage and dependencies of other developers who have other applications that are still using old locations for those resources.

At 110, the resource location resolution service identifies a reference to a first resource that originates from an application processing on a machine. That is, an application processing within a project processing environment makes an attempt via the reference to access the first resource. The first resource can be any resource listed above, such as a file, a policy, another application, etc.

According to an embodiment, at 111, the resource location resolution service monitors calls that emanate from the application, within the project processing environment, to detect the reference. So, the application may not even be aware of the resource location resolution service.

At 120, the resource location resolution service determines whether the reference is a first key, which is associated with the first resource, or whether the reference is a file path, which is also associated with the first resource. When the reference is the file path, the resource location resolution service hashes the file path (and in some cases as discussed below other factors) to generate the first key. So, the reference can be the first key or a file path that gets hashed to the first key.

At 130, the resource location resolution service resolves the first key to a current location, which is known for the first resource. The first key maps to a current location for the first resource. This occurs in a dynamic and real time fashion, such that the current location is discovered via a map that points to the currently location for the first resource. This reduces the conventional brittleness by avoiding hardcoded locations or permitting legacy hardcoded locations that are dynamically translated to the first key. The resource location resolution service (via the first key) maintains a dynamic mapping to the current location, so the legacy location can be changed without breaking other applications that depend on the resource.

In an embodiment, at 131, the resource location resolution service identifies the first resource as a file that is located at the current location and is at least partially named within the current location using the first key. So, a file defines the first resource (such as a schema for the resource), and that file is detectable by the resource location resolution service because part of the file's name includes the first key. Example of this are provided below.

At 140, the resource location resolution service redirects the reference that originated from the application to the current location for purposes of the application accessing the first resource. The application call made via the reference to the first resource is intercepted by the resource location resolution service, translated to the key, mapped to the current location, and then the call is redirected to the current location.

The application may be entirely unaware of what occurred. So, the application can be a legacy application using an old hardcoded location reference to the first resource when in fact the first resource has been moved to the current location. The application still processes normally and uninterrupted and access provided to the first resource even though the application code has not been modified to reflect the current location. Similarly, the application may be a new application that uses the first key to make a reference to the first resource. In this case, the processing still works because the resource location resolution service detects the reference as the key and resolves it to the current location, and redirects the application to the current location for access to the first resource.

In an embodiment, at 150, the resource location resolution service detects a project being loaded within a processing environment of the machine or an entirely different machine for that which processes the resource location resolution service. The project includes the first resource. Next, the resource location resolution service scans the project during the load to acquire the current location for the first resource. The resource location resolution service also maintains an index that includes the first key, which maps to the current location.

Continuing with the embodiment of 150, at 151, the resource location resolution service detects the first key as being referenced during the load as an identifier for the first resource. So, the load may include an identifier rather than a conventional file path.

In an embodiment, at 152, the resource location resolution service generates the first key as a globally unique identifier (GUID) during a first and initial load of the project.

In another variation of the embodiment at 150, and at 153, the resource location resolution service detects the file path as being referenced during the load as an identifier for the first resource. In response to this, the resource location resolution service hashes the file path (and perhaps other factors in some cases discussed below with reference to the FIG. 2) to the first key. The first key is retained in the index to map to the current location.

It is noted that the current location can be changed at any time by the stakeholder, owner, or developer with the appropriate security rights. The resource location resolution service notes the change and keeps the current location up-to-date and mapped to the first key. So, the first resource is free to be moved as needed and other dependent applications can continue to use the first resource as if it never moved from where those other dependent applications believed that first resource to be.

Some example illustrations are now provided to further highlight the features of the resource location resolution service.

The resource location resolution service does not store file references in model project files (whether full paths or relative), but stores the references as keys. Each key uniquely identifies the other object/file it's pointing to. So an example extensible markup language (XML) file that defines a resource object may appear as follows:

---

Library File
    <Object name="Policy Library 2" type="Library">
        <relations name="policy" type="Child"
        key="AC357MQZ"/>
    </Object>
Driver File
    <Object name="AD Driver" type="driver">
        <relations name="InputPolicies" type="References"

```
key="AC357MQZ"/>
</Object>
```

This way, if the resource object that another object is pointing to moves, no other resource is affected. The files don't go dirty, and there is not any tension in a team enabled version controlled environment and project environment.

Dereferencing Keys

There is a need for a mechanism to dereference these keys into real file locations when the model is trying to load objects/resources. In an embodiment, the mechanism is that when the model is first loaded, that resource location resolution service scans the project directories and identifies all of the unique keys of each object and records their locations. This becomes the map that the model loader uses from that point on.

So, when the code has a reference to a driver and the code wants to find out all of the policies that it are referring to driver, the code just passes the key into the resource location resolution service, which resolves the key to a real full path, where it can be successfully loaded. It's all transparent to the user and to the code.

Keys

In an embodiment, the keys are randomly generated Globally Unique Identifiers (GUID's) and are used in the actual file name. So, in the above example the policy is really defined in a file called AC357MQZ.xml on the file system.

It is noted that in some cases, the application or code may be modified to consult the resource location resolution service when it makes an attempt to reference the first resource and an error is returned indicating it was not found. The resource location resolution service then resolves the reference on behalf of the code. So, the code can be unaware of the resource location resolution service or can be aware and actively consult the resource location resolution service. Either mechanism or combination of mechanisms can be used. It may also be that the error returned when the reference fails to locate the first resource causes an event to be raised that the resource location resolution service detects and processes before that error is returned to the calling application/code.

Figure 2:
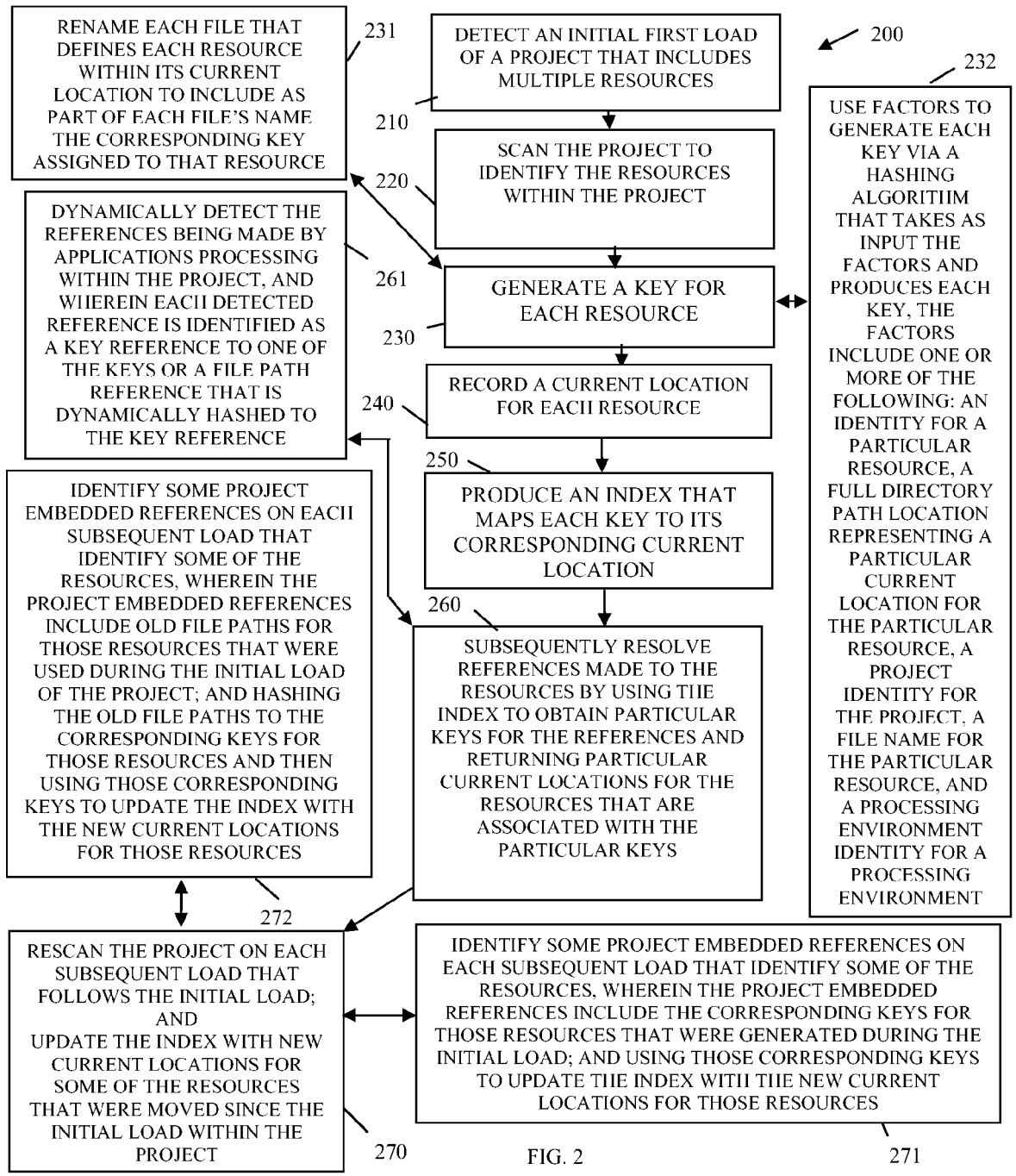
FIG. 2 is a diagram of a method for managing resource locations of a project, according to an example embodiment.

FIG. 2 is a diagram of a method 200 for managing resource locations of a project, according to an example embodiment. The method 200 (hereinafter "resource location management service") is implemented as instructions in a machine-accessible and readable medium. The instructions when executed by a machine perform the processing depicted in the FIG. 2. The resource location management service is also operational over and processes within a network. The network may be wired, wireless, or a combination of wired and wireless.

The resource location management service represents front-end processing associated with resource location resolution service represented by the method 100 discussed above with the FIG. 1. In other words, the resource location management service is used to initially set up a mechanism that the resource location resolution service leverages and uses.

At 210, the resource location management service detects an initial first load of a project that includes multiple resources. That is, when a project is loaded a first time within a project processing environment or when it is loaded the first time after the resource location management service is initiated for the first time. The resource location management service performs the processing discussed herein and below.

At 220, the resource location management service scans the project to identify the resources within the project. That is, the project schema and files are scanned to identify the resources of the project.

At 230, the resource location management service generates a key for each resource. Each unique resource includes a corresponding globally unique identifier (GUID) within the project.

According to an embodiment, at 231, the resource location management service renames each file that defines each resource within its current location or the project directory to include as part of each file's name the corresponding key assigned to that particular resource. An example of this was provided above with reference to the method 100 of the FIG. 1.

In another case, at 232, the resource location management service uses factors to generate each key via a hashing algorithm. The hashing algorithm takes as input the factors and produces each key. The factors include one, more, or all of the following factors: an identify for a particular resource, a full directory path location representing a particular current location for the particular resource, a project identity for the project, a file name for the particular resource, and/or a processing environment identity for the project processing environment.

At 240, the resource location management service records a current location (at the time of the initial and first load of the project) for each resource of the project.

At 250, the resource location management service produces an index that maps each key to its corresponding current location.

At 260, the resource location management service subsequently is used (after the initial load and processing discussed at 210-250) for resolving references made to the resources. This is done by the resource location management service using the index to obtain particular keys for the references and returning particular current locations for the resources, which are associated or assigned to the particular keys.

According to an embodiment, at 261, the resource location management service dynamically detects in real time the references being made by applications processing within the project during the lifecycle of the project. Each detected reference is identified as a key reference to one of the keys or a file path that is dynamically hashed to the key reference.

In a particular case, at 270, the resource location management service rescans the project on each subsequent load that follows the initial load. During the rescan, the resource location management service updates the index with new current locations for some of the resources that were moved since the initial load within the project.

Continuing with the embodiment of 270 and at 271, the resource location management service identifies some project embedded references on each subsequent load that identify some of the resources. The project embedded references include the corresponding keys for those resources that were generated during the initial load. The resource location management service then uses those corresponding keys to update the index with the new current locations for those resources.

In another variation to the embodiment of 270 and at 272, the resource location management service identifies some project embedded references on each subsequent load that identify some of the resources. Here, the project embedded references include old file paths for those resources that were used during the initial load of the project. Next, the resource location management service hashes the old file paths to the corresponding keys for those resources and then uses those corresponding keys to update the index with the new current locations for those resources.

Figure 3:
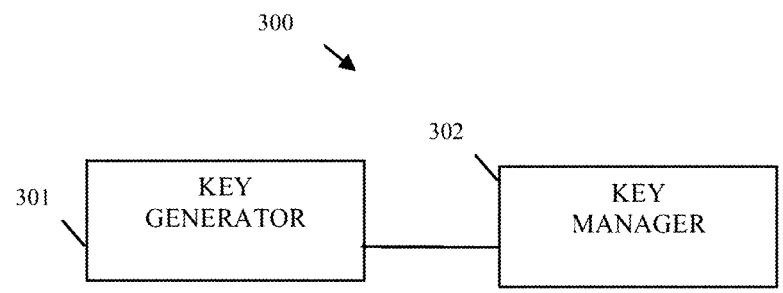
FIG. 3 is a diagram of a project resource location resolution system, according to an example embodiment.

FIG. 3 is a diagram of a project resource location resolution system 300, according to an example embodiment. The project resource location resolution system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The project resource location resolution system 300 is also operational over a network and the network may be wired, wireless, or a combination of wired and wireless.

The project resource location resolution system 300 includes a key generator 301 and a key manager 302. Each of these components and their interactions with one another will now be discussed in turn.

The key generator 301 is implemented in a machine-accessible and a computer-readable storage readable medium and is to process on a machine within of the network. Some example processing associated with the software module loader 301 was described in detail above with reference to the methods 100 and 200 of the FIGS. 1 and 2, respectively.

The key generator 301 is called upon or used for generating a key for a resource of a project when the project is loaded within a project processing environment for a first or initial time.

In an embodiment, the key generator 301 uses a variety of pre-configured factors, which are associated with the resource in combination with a hashing algorithm to generate the key.

The key manager 302 is implemented in a machine-accessible and a computer-readable storage medium and is to process on the same machine as the key generator 301 or an entirely different machine of the network.

The key manager 302 uses the key to create an index that maps the key to an initial location for the resource within the project. The initial location subsequently changes during subsequent loads of the project within the project processing environment. The key manager 302 then updates the index to map the key to the changed location. Also, the key manager 302 dynamically resolves references made to the resource during a lifecycle of the project to a then-current location for the resource within the project processing environment using the index and the key.

In an embodiment, the key manager 302 renames a file that defines the resource so at least a portion of a name for that file includes the key. This was discussed and presented by way of examples above with reference to the methods 100 and 200 of the FIGS. 1 and 2, respectively.

In still another case, the key manager 302 permits the references made to the resource to include the key or previously valid file paths to the resource, which are no longer accurate to access the resource. So, the previously valid file paths point to old locations for the resource but the key manager 302 is capable of resolving the old locations to the key and then mapping to a current location for the resource.

According to an embodiment, the key manager 302 dynamically detects when a current location for the resource changes. This occurs while the project is being processed and not necessarily during a load of the project. In response to this detection, the key manager 302 dynamically updates the index to reflect the change. This occurs between loads so as to permit dynamic and real time updates to the index for the proper location of the resource.

In another case, the key manager 302 scans files of the project after the first load for embedded references to the resource and replaces the embedded references within files of the project with the key.

Figure 4:
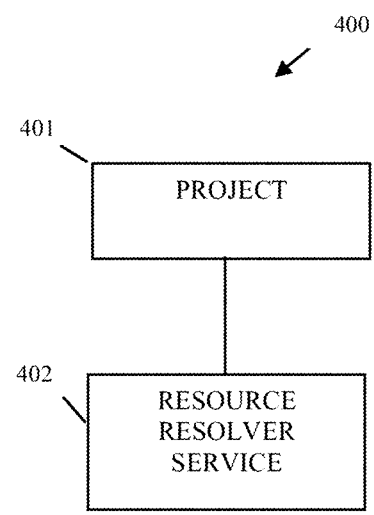
FIG. 4 is a diagram of another project resource location resolution system, according to an example embodiment.

FIG. 4 is a diagram of another project resource location resolution system 400, according to an example embodiment. The project resource location resolution system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The project resource location resolution system 400 is also operational over a network and the network may be wired, wireless, or a combination of wired and wireless.

The project resource location resolution system 400 includes a project 401 and a resource resolver service 402. Each of these components and their interactions with one another will now be discussed in turn.

The project 401 is represented as resources that are implemented in a machine-accessible and computer-readable storage medium and that process on one or more machines of the network.

The project 401 is initially loaded into a project processing environment on the machines. The embedded references to the resources within the project are translated to keys. Each key for each resource maps to a then-existing location for that resource within the project processing environment.

According to an embodiment, the keys and the then-existing locations for the resources are maintained in an index that is dynamically updated to reflect the current locations. The keys remain unchanged within the index. The processing references are hashed by the resource resolver service 402 to acquire the keys that are then used to search the index for the current locations.

In an embodiment, the keys are randomly generated and each key is also used as part of a file name that defines a corresponding resource to which that key relates.

The resource resolver service 402 is implemented in a machine-accessible and computer-readable storage medium. Furthermore, the resource resolver service 402 processes on one of the machines of the network. Example processing associated with the resource resolver service 402 was presented in detail above with reference to the methods 100 and 200 of the FIGS. 1 and 2, respectively, and with respect to the system 300 of the FIG. 3.

The resource resolver service 402 dynamically resolves processing references made for the resources by determining the keys and locating current locations within the project processing environment that are associated with those keys.

In an embodiment, the resource resolver service 402 intercepts the processing references during execution of the project and dynamically and in real time supplies the current locations to the applications that originated the references.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   identifying a reference made to a first resource that originates from an application processing on a machine;
   determining that the reference is a first key associated with the first resource;
   resolving the first key to a current location known for the first resource by using the key to access a map that points to the current location, a dynamic mapping to the current location is maintained permitting a legacy location for the application to change to the current location without breaking other applications that depend on the first resource; and
   redirecting the reference that originated from the application and directed to the legacy location to the current location for the application to access the first resource.

2. The machine-implemented method of claim 1 further comprising:
   detecting a load of a project having the first resource and other resources within a processing environment associated with the machine or an entirely different machine of a network; and
   scanning the project during the load for the current location of the first resource and maintaining an index having the first key that maps to the current location.

3. The machine-implemented method of claim 2, wherein scanning further includes detecting the first key as being referenced during the load as an identifier for the first resource.

4. The machine-implemented method of claim 2, wherein scanning further includes generating the first key as a globally unique identifier (GUID) during a first load of the project.

5. The machine-implemented method of claim 1, wherein identifying further includes monitoring calls that emanate from the application to detect the reference.

6. The machine-implemented method of claim 1, wherein resolving further includes identifying the first resource as a file that is located at the current location and is at least partially named within the current location using the first key.

7. A machine-implemented method, comprising:
   detecting an initial first load of a project that includes multiple resources;
   scanning the project to identify the resources within the project;
   generating a key for each resource, renaming each file that defines each resource within its current location of the project to include as part of each file's name the corresponding key assigned to that resource;
   recording a current location for each resource;
   producing an index that maps each key to its corresponding current location, and maintaining a dynamic mapping to the current location permitting a legacy location that references each resource to change without breaking other applications that depend on each of the resources; and
   subsequently resolving references made to each of the resources, each reference directed to a particular resource's legacy location, by using the index with particular keys for each of the references to obtain and to return particular current locations for each of the resources that are associated with the particular keys.

8. The machine-implemented method of claim 7 further comprising:
   rescanning the project on each subsequent load that follows the initial load; and
   updating the index with new current locations for some of the resources that were moved since the initial load within the project.

9. The machine-implemented method of claim 8, wherein rescanning further includes identifying some project embedded references on each subsequent load that identify some of the resources, wherein the project embedded references include the corresponding keys for those resources that were generated during the initial load; and using those corresponding keys to update the index with the new current locations for those resources.

10. The machine-implemented method of claim 8, wherein rescanning further includes identifying some project embedded references on each subsequent load that identify some of the resources, wherein the project embedded references include old file paths for those resources that were used during the initial load of the project; and hashing the old file paths to the corresponding keys for those resources and then using those corresponding keys to update the index with the new current locations for those resources.

11. The machine-implemented method of claim 7, wherein generating further includes using factors to generate each key via a hashing algorithm that takes as input the factors and produces each key, the factors include one or more of the following: an identity for a particular resource, a full directory path location representing a particular current location for the particular resource, a project identity for the project, a file name for the particular resource, and a processing environment identity for a processing environment of the project.

12. The machine-implemented method of claim 7, wherein subsequently resolving further includes dynamically detecting the references being made by applications processing within the project, and wherein each detected reference is identified as a key reference to one of the keys or a file path reference that is dynamically hashed to the key reference.

13. A machine-implemented system, comprising:
   a machine having a key generator implemented in a non-transitory computer-readable storage medium and to process on the machine within a network; and
   the machine of a different machine having a key manager implemented in a non-transitory computer-readable storage medium and to process on the machine or the different machine of the network;
   wherein the key generator is to generate a key for a resource of a project when the project is loaded within a project processing environment for a first time, and wherein the key manager uses the key to create an index that maps the key to an initial location for the resource within the project, and the key is inserted back into the project for specific references made to the resource within the project, and wherein the initial location subsequently changes during subsequent loads of the project within the project processing environment and the key manager updates the index to map the key to the changed location, and wherein the key manager dynamically resolves references made to the resource, the references directed to the initial location for the resource, during a lifecycle of the project to a then-current location for the resource within the project processing environment using the key embedded with those references in the project, dynamic mappings are maintained to the then-current location permitting the initial location for the resource to dynamically change without breaking other applications that depend on the resource.

14. The machine-implemented system of claim 13, wherein the key generator uses a variety of pre-configured factors associated with the resource in combination with a hashing algorithm to generate the key.

15. The machine-implemented system of claim 13, wherein the key manager is to rename a file that defines the resource so that at least a portion of a name for the file includes the key.

16. The machine-implemented system of claim 13, wherein the key manager permits the references made to the resource to include the key or previously valid file paths to the resource that are no longer accurate to access the resource.

17. The machine-implemented system of claim 13, wherein the key manager dynamically detects when a current location for the resource changes while the project is being processed and dynamically updates the index to reflect that change, and wherein the update to the index occurs in between loads of the project.

18. A machine-implemented system, comprising:
one or more machines of a network having a project represented as resources that are implemented in a non-transitory computer-readable storage medium and that processes on the one or more machines of the network; and
the one or more machines of the network having a resource resolver service implemented in a non-transitory computer-readable storage medium and that processes on the one of the machines of the network;
wherein when the project is initially loaded into a project processing environment on the machines, embedded references to the resources within the project are translated to keys, and the keys are inserted into the project with the embedded references, each key for each resource maps to a then-existing location for that resource within the project processing environment, and wherein the resource resolver service dynamically resolves references made for the resources, the references directed to legacy locations for the resources, by using the keys and locating the then-existing location for each of the resources within the project processing environment that are associated with those keys, dynamic mappings are maintained to each resource's the then-existing location permitting the legacy location of each resource to change without breaking other applications that depend on each of the resources.

19. The machine-implemented system of claim 18, wherein the resource resolving service intercepts the processing references during execution of the project and supplies the current locations.

20. The machine-implemented system of claim 18, wherein the keys and the then-existing locations for the resources are maintained in an index that is dynamically updated to reflect the current locations, and wherein the keys remain unchanged within the index.

21. The machine-implemented system of claim 20, wherein the processing references are hashed by the resource resolving service to acquire the keys that are then used to search the index for the current locations.

22. The machine-implemented system of claim 18, wherein the keys are randomly generated and each key is used as part of a file name that defines a corresponding resource to which that key relates.

* * * * *

UNITED STATES PATENT AND TRADEMARK OFFICE
CERTIFICATE OF CORRECTION

PATENT NO.         : 8,806,499 B2
APPLICATION NO.    : 12/120793
DATED              : August 12, 2014
INVENTOR(S)        : Thurgood et al.

It is certified that error appears in the above-identified patent and that said Letters Patent is hereby corrected as shown below:

In the Claims

In column 10, line 50, in Claim 13, delete "of" and insert --or--, therefor

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,806,499 B2 | Page 1 of 1 |
| APPLICATION NO. | : 12/120793 | |
| DATED | : August 12, 2014 | |
| INVENTOR(S) | : Thurgood et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1532 days.

Signed and Sealed this
Twenty-first Day of July, 2015

Michelle K. Lee
*Director of the United States Patent and Trademark Office*